(12) United States Patent
Satyavolu et al.

(10) Patent No.: US 7,225,464 B2
(45) Date of Patent: May 29, 2007

(54) METHOD FOR VERIFYING THE IDENTITY OF A USER FOR SESSION AUTHENTICATION PURPOSES DURING WEB NAVIGATION

(75) Inventors: Ramakrishna Satyavolu, Santa Clara, CA (US); Joaquin Gamboa-Pani, Mountain View, CA (US)

(73) Assignee: Yodlee.com, Inc., Redwood Shores, CA (US)

( * ) Notice: Subject to any disclaimer, the term of this patent is extended or adjusted under 35 U.S.C. 154(b) by 812 days.

(21) Appl. No.: 10/116,192

(22) Filed: Apr. 3, 2002

(65) Prior Publication Data

US 2003/0191964 A1    Oct. 9, 2003

(51) Int. Cl.
*H04L 29/06* (2006.01)
(52) U.S. Cl. ............................................. 726/10; 726/8
(58) Field of Classification Search ................ 713/202; 726/8, 10
See application file for complete search history.

(56) References Cited

U.S. PATENT DOCUMENTS

| | | | | |
|---|---|---|---|---|
| 6,041,357 | A * | 3/2000 | Kunzelman et al. | ........ 709/228 |
| 6,275,941 | B1 * | 8/2001 | Saito et al. | ..................... 726/2 |
| 2002/0144108 | A1 * | 10/2002 | Benantar | ..................... 713/156 |
| 2002/0144119 | A1 * | 10/2002 | Benantar | ..................... 713/171 |

OTHER PUBLICATIONS

Winer, "XML-RPC for Newbies", Jul. 14, 1998, pp. 1-4, obtained from http://davenet.scripting.com/1998/07/14/xmlRpcForNewbies.*
GPayments, "Authentication, The missing element in online payment security", 2001, pp. 1-19, obtained from http://www.gpayments.com/pdfs/GPayments_Authentication_Whitepaper.pdf.*

Microsoft, "Passport Fact Sheet", Oct. 25, 2000, pp. 1-4, obtained from http://web.archive.org/web/20001025095005/www.passport.com/Press/PressFactSheet.asp?PPlcid=1033.*
Funk, "Steel-Belted Radius/Service Provider Edition is now available", Oct. 1, 1999, pp. 1, obtained from http://web.archive.org/web/20010620082923/www.funk.com/New_one/news/pn_spev10.htm.*
Sun Micosystems, "What Is Virtual Hosting?", 1997, pp. 1, obtained from http://ulysses.uchicago.edu/docs/VH.doc1.html.*
Birrell, Andrew, "RPC Reality, Position Paper for SigOps European Workshop", 1992, pp. 1-3, obtained from http://birrell.org/andrew/papers/RPCReality.txt.*
Housley et al., "Internet X.509 Public Key Infrastructure Certificate and CRL Profile", RFC2459, Jan. 1999, pp. 32-34.*

* cited by examiner

*Primary Examiner*—Emmanuel L. Moise
*Assistant Examiner*—Jeffrey D. Popham
(74) *Attorney, Agent, or Firm*—Donald R. Boys; Central Coast Patent Agency, Inc.

(57) ABSTRACT

A network-based software application for enabling remote authentication of a user during a network session has a server portion for serving session validation information and additional user information when queried, a client portion for configuring and submitting parameters constraining what and how data is to be shared with a querying entity or entities, and a distributed portion for distribution and application at various connected network nodes for enabling those nodes to recognize and interact with the server portion. The application is characterized in that the server portion generates a temporary session token after a first successful authentication by the user at a web site during a network session, the token cached at the host machine of the server portion and at the user's machine or proxy machine and wherein upon navigation by the user to a next web site or form requiring secure authentication, the token is used to identify the user and a remote call is used to validate the user session instead of requiring manual authentication procedures.

16 Claims, 4 Drawing Sheets

METHOD FOR VERIFYING THE IDENTITY OF A USER FOR SESSION AUTHENTICATION PURPOSES DURING WEB NAVIGATION

FIELD OF THE INVENTION

The present invention is in the field of network browser navigation and authentication methods and pertains particularly to a method for site verification of a user.

BACKGROUND OF THE INVENTION

Internet browser navigation, typically referred to as "Web surfing" in the art, is well known as a mechanism enabling user access to server-stored electronic information pages on a navigable network such as the Internet network. A typical user navigating the Internet for example may be subscribed to many password-protected Web sites that offer some form of service to the user. Examples of password-protected sites may include financial service sites such as investment, mortgage, and online banking sites, travel sites, certain entertainment and music sites, news service and information sites, and so on.

Typically, a user will have a variety of different passwords and/or personal identification numbers (PIN) that must be provided to successfully log in to many of the types of sites described above. As a result, a user is frequently required to enter login information as new password protected sites or pages are navigated to. A Web browsing session embarked to conduct a large chunk of Web business, for example, may involve several logins during one Internet session. Having to remember many passwords and PIN numbers can be problematic for a user.

One way to deal with this problematic scenario that is known to the inventor has been to aggregate and manage a user portfolio of passwords and other login information at a secure proxy/portal location such that automated aggregation and automated logins, when required are performed using the appropriate stored passwords from the user profile. Although this method is secure and fairly error free, some users are never the less uncomfortable having a third party manage their security passwords and other critical information.

In prior art, a federated convention known as domain name service (DNS) exists that provides a look-up service for IP addresses on a network for navigating purposes. The service finds an IP address for a querying machine. The IP address is a temporary network address comprising numbers separated by dots. IP addresses are both allocated and assigned depending on the type of use and class of the address. Every desktop machine and network server capable of TCP/IP communication has DNS software installed. A client machine that is transient will retain the same IP address only while it is logged on to the Internet during a single network session. While DNS system can identify a specific machine during a multi-site browsing session, it cannot provide any specific user information.

It has occurred to the inventor that if the host of a password protected or otherwise secure Web site or Web function could identify a user remotely by knowing the user ID at a level that is more granular than the IP address and could validate the state of a current session from a reliable source, then it could gain efficiency by servicing the user as logged in Therefore, what is clearly needed in the art is a distributable user verification system and service that can authenticate user to site hosts along any navigation sequence and enable the user to avoid repeated login procedures that may have otherwise been required along the navigated route.

SUMMARY OF THE INVENTION

In a preferred embodiment of the present invention a network-based software application for enabling remote authentication of a user during a network session is provided, comprising a server portion for serving session validation information and additional user information when queried, a client portion for configuring and submitting parameters constraining what and how data is to be shared with a querying entity or entities, and a distributed portion for distribution and application at various connected network nodes for enabling those nodes to recognize and interact with the server portion. The application is characterized in that the server portion generates a temporary session token after a first successful authentication by the user at a web site during a network session, the token cached at the host machine of the server portion and at the user's machine or proxy machine and wherein upon navigation by the user to a next web site or form requiring secure authentication, the token is used to identify the user and a remote call is used to validate the user session instead of requiring manual authentication procedures.

In a preferred embodiment the network is the Internet network and the session is a browser session. Further, the communication between nodes for user session validation may be XML-based, HTML-based, or RPC-based.

In preferred embodiments the first successful authentication before token generation may be a manual login procedure to a web-site. Also in preferred embodiments the first successful authentication before token generation may be a successful purchase.

In some cases the distributed portion is code that is distributed to a node from the client portion at first connection. The code may be self-installable at the receiving node.

In another aspect of the invention a method for verifying an on-line user remotely is provided, comprising steps of (a) generating a token for a user session the token containing at least one set of authentication data just entered to gain access to a first secure site or function during the session; (b) storing the generated token at the user machine or proxy machine and at the issuer site; (c) delivering the generated token from the user to the first site; (d) recognizing the generated token at the site and using the token information to validate the user as the user navigates the site; (e) delivering the token to a new site navigated to wherein the new site is hosted by a new sever; and (f) recognizing the generated token at the new site and using the token information to validate the user as the user navigates the new site.

In some preferred embodiments, in step (a), the authentication data is a username and password used to login to the site. In other preferred embodiments, in step (a), the authentication data is wallet information used to carry out a purchase. In step (b) the issuer may be an ISP for the user. In some cases, in step (c), the first site is the ISP web site. In step (d) validation may include a remote call to the issuer site of the token.

In some cases, in step (d), navigating the site includes subsequent logins and/or secure purchasing using the same sever. In step (e) the new server and site may be accessed within the same user session. Further, in step (f) the receipt of the token may provide data for identifying user name and the user's IP address as well as the issuer's machine address.

BRIEF DESCRIPTION OF THE DRAWING FIGURES

DESCRIPTION OF THE PREFERRED EMBODIMENTS

The inventor provides a novel method and apparatus for enabling remote site-verification of a user during Web surfing across multiple sites, avoiding any requirement for manual login procedures at password-protected web sites subscribed to by the user. The method and apparatus of the present invention is explained in enabling detail below.

Figure 1:
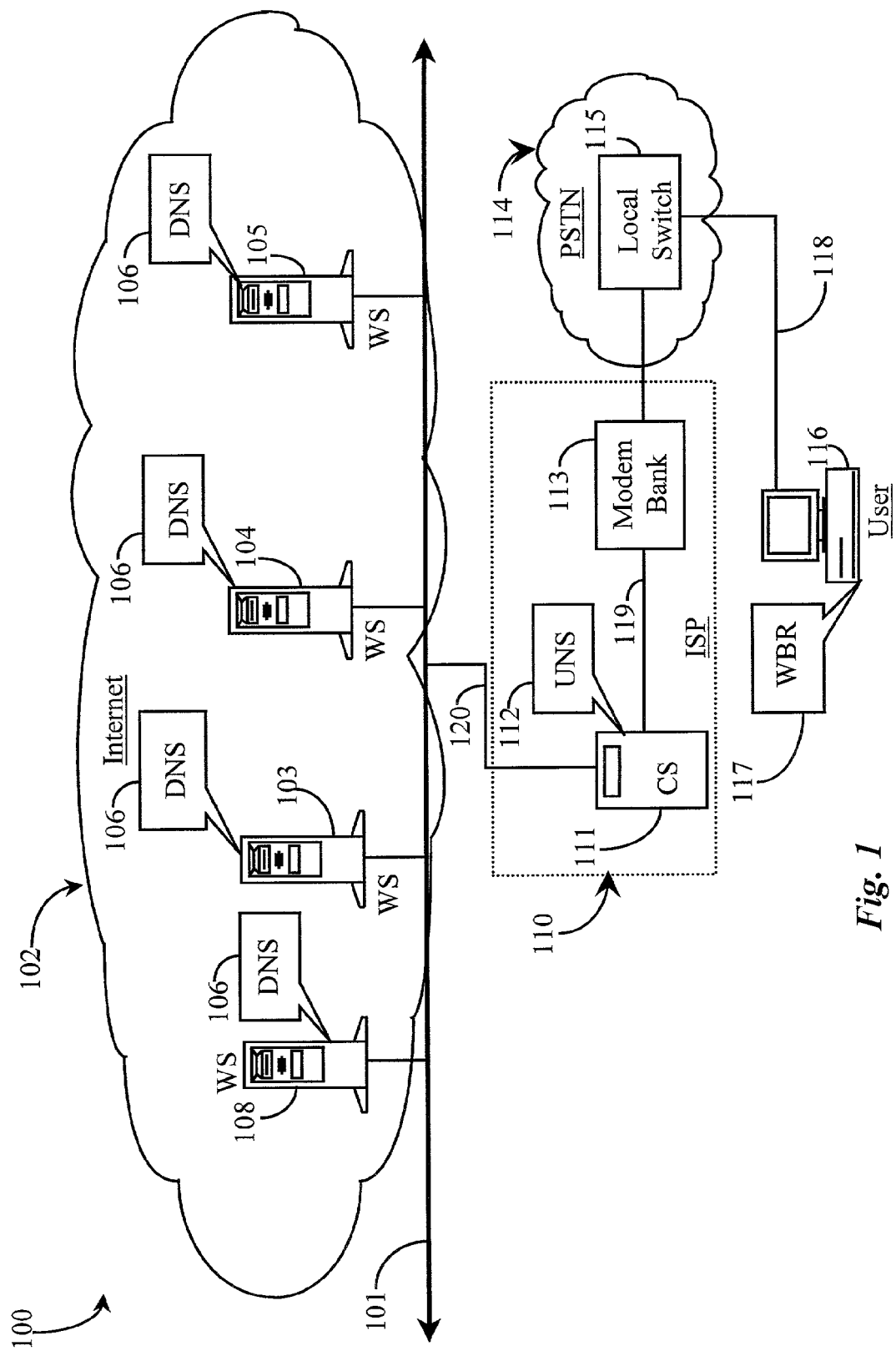
FIG. 1 is a system overview of a navigable network where distributed verification services are practiced.

FIG. 1 is a system overview illustrating a navigable network 100 wherein a user verification service according to an embodiment of the invention is practiced. Communications network 100 primarily consists of a data packet network (DPN) 102 labeled herein the Internet network. It may be assumed that sub-networks and COST networks are also part of network 100. In this example, a public-switched telephone network (PSTN) 114 is illustrated as a connecting sub-network to Internet 102. An Internet service provider (ISP) 110 is illustrated between an illustrated user 116, and Internet 102.

Internet 102 is represented in this example as a network cloud and also by an Internet backbone 101 extending through cloud 102. Backbone 101 represents all of the lines connection points and equipment making up the Internet network as a whole. Therefore, there are no geographic limits to the practice of the present invention. The inventor chooses the Internet network in this example because of availability of known standard protocols and high public accessibility. In alternate embodiments, the invention could be applied to other wide-area-networks (WAN).

Within Internet 102 there are several Web servers (WS) illustrated and shown having data connectivity to backbone 101. These are WS 108, WS 103, WS 104 and WS 105. WS 103–108 are Internet file severs adapted to serve electronic information pages known as Web pages in the art. These servers represent any type of on-line service host that is available to users logged into and navigating the Internet. For example, server 108 may be a bank server, server 103 may be a shopping club server, server 104 may be an investment server and server 105 could be an entertainment server such as an on-line movie server. There are many such possibilities. The type of service a user accesses is not relevant to the present invention. However a goal of the invention is to enable a user to traverse password protected Web-sites during normal Web navigation and not have to log in to any of the secure sites that normally would require that the user log-in.

Servers 103, 104, 105, and 108 have instances of DNS software (106) installed and operative therein. Each instance of DNS may be considered as identical to the others, hence one element number 106 is given for all illustrated instances. DNS software 106 functions in cooperation with at least one DNS server machine not shown here, but a part of network 102. DNS server software 106 is adapted to provide look-up service for network addresses to querying machines connected to the Internet according to known art. Typically a first DNS server would be that of a user's ISP such as ISP 110. However, there could be many DNS servers including root servers involved in returning a portion of or all of a network address to a querying machine.

Within ISP 110 there is illustrated a modem bank 113. Modem bank 113 is adapted to connect users through to the Internet as is known in the art of dial-up/modem Internet connection. Modem bank 113 is connected by digital link 119 to a connection server (CS) 111. CS 111 is connected to Internet backbone 101 by way of an Internet access line 120. CS 111 has a unique instance of software termed user name service (UNS) software by the inventor and given the element number 112 in this example.

UNS software 112 is adapted to lookup and provide a user name to go along with the user's IP address. CS server 111 is adapted to hold pertinent user information in encrypted format in such as a database (not shown) internal to or external from CS 111. Persistent user information would include username/password information to ISP services and possibly additional information for logging into other service sites. User information may also include contact data such as e-mail address, phone numbers, physical address, and so on. User information may further include wallet information such as a social security number, credit card numbers, and so on.

On the other side of modem bank 113 there is shown a PSTN network (114) and a local telephone switch 115. Local switch 115 represents a local telephony switch such as a PBX or ACD type switch. User 116 is connected to switch 115 within cloud 114 by way of a telephone line 118. It is noted that there are other types of Internet-connection architectures, any one of which can be used in the practice of the present invention. A dial-up connection as illustrated herein should not be construed as a limitation of the invention.

User 116 is illustrated as a PC icon in this example, however it should be noted that other types of network-capable equipment can be substituted for a PC. User 116, also referred to herein at times as PC 116, has a Web browser or Client Application 117 operational and adapted under the right circumstances to enable Web-browsing as known in the art. Using application 117, user 116 can visit any reachable server in network 102. Client application 117 has a DNS configuration control (not shown) that functions to query a DNS server for an address for navigation as is known in the art. Similarly, every machine that logs on to network 102 receives a temporary IP address from the network, typically through the connecting ISP. The addresses are temporarily assigned for transient machines (not connected at all times) and are only valid under a current network session.

Connection server 111 has an instance of the unique User Name Service (UNS) software 112 provided therein and adapted, in one embodiment, as an extension to DNS software already operating within server 111. UNS software 112 provides an extra level of realization to DNS, being a user name or ID associated with an IP address. In this example, ISP 110 is considered the service provider that will provide the service of the present invention. In another embodiment, a third party other than ISP 110 may provide the service of the invention. All that is required to practice the invention is at least one network data source requiring authentication, an issuer to generate an authentic token and a network end node accessible from an operating data network. The end point hosting the client capability may be a proxy server of the client, a client desktop computer, an application on the desktop, or even a peripheral communication with the desktop computer. The issuer can be an ISP, or any other provider of services. In a preferred embodiment, the system of the invention is federated, meaning that users may have access to and practice the invention regardless of network access provider and method of connection.

In practice of the invention according to the instant embodiment and architecture of FIG. 1, user 116 logs in to network 102 by way of telephone line 118 through switch 115 in PSTN 114 and into modem bank 113 within ISP 110. Connection server 111 completes an Internet connection on behalf of user 116 via access line 120 to backbone 101. User 116 provides his user name and password at the time of access in order to obtain a browsing session first at his or her designated home page, typically served by CS 111. It is noted that an IP address has been assigned to user 116, which is to the user's machine.

CS 111 generates a session ID for user 116 and embeds it into a token, termed a UNS token by the inventor. In one embodiment a UNS token has the user name and password for the last manual authentication embedded therein as well as a session ID number and the IP address assigned to the user's machine 116 for the current network session. The UNS token also has the issuer information, in this case, the ISP machine address, also embedded therein. In one embodiment, the token is a reference number that can point to the information stored locally or in distributed fashion.

The UNS token is in one embodiment delivered to machine 116 and cached therein in a local browser cache. The session token is also cached at UNS provider/server CS 111. When user 116 decides to browse to another universal resource locator (URL) that requires a password say, for example, one served by WS 108, the user's UNS token is sent to the server hosting the URL. Server 108 recognizes the UNS token and accesses CS 111 to verify that the UNS token is valid (has not timed out, has same IP address, etc.). If the UNS token is valid, then user 116 can avoid an authentication login requirement at server 108 and he or she will be serviced as if logged in with a password.

As long as a session ID is still valid, user 116 may browse and make purchases etc, at various sites without being required to log in. XML based protocol is, in a preferred embodiment, used in machine-to-machine "paging" when verifying a user's active session. In another embodiment RPC procedures can be used. UNS resolution borrows DNS convention for typical domain lookup and adds one more level, that of user ID to the session as well as session issuer information as described above. Using this technique, user 116 may browse and access any URL hosted by servers 108, 103, 104, and 105 without being required to supply any passwords and the like created or issued in accordance with the user's subscriptions. Moreover, each mentioned server can remotely page the session issuer over a secure connection for additional encrypted user information, such as credit card numbers, and so on for automated purchases. Node-to-Node communication can be XML-based, for example, Simple Object Access Protocol (SOAP), or perhaps Security Assertion Markup Language (SAML) over a secure connection, or some other machine-to-machine protocol such as RPC.

Figure 2:
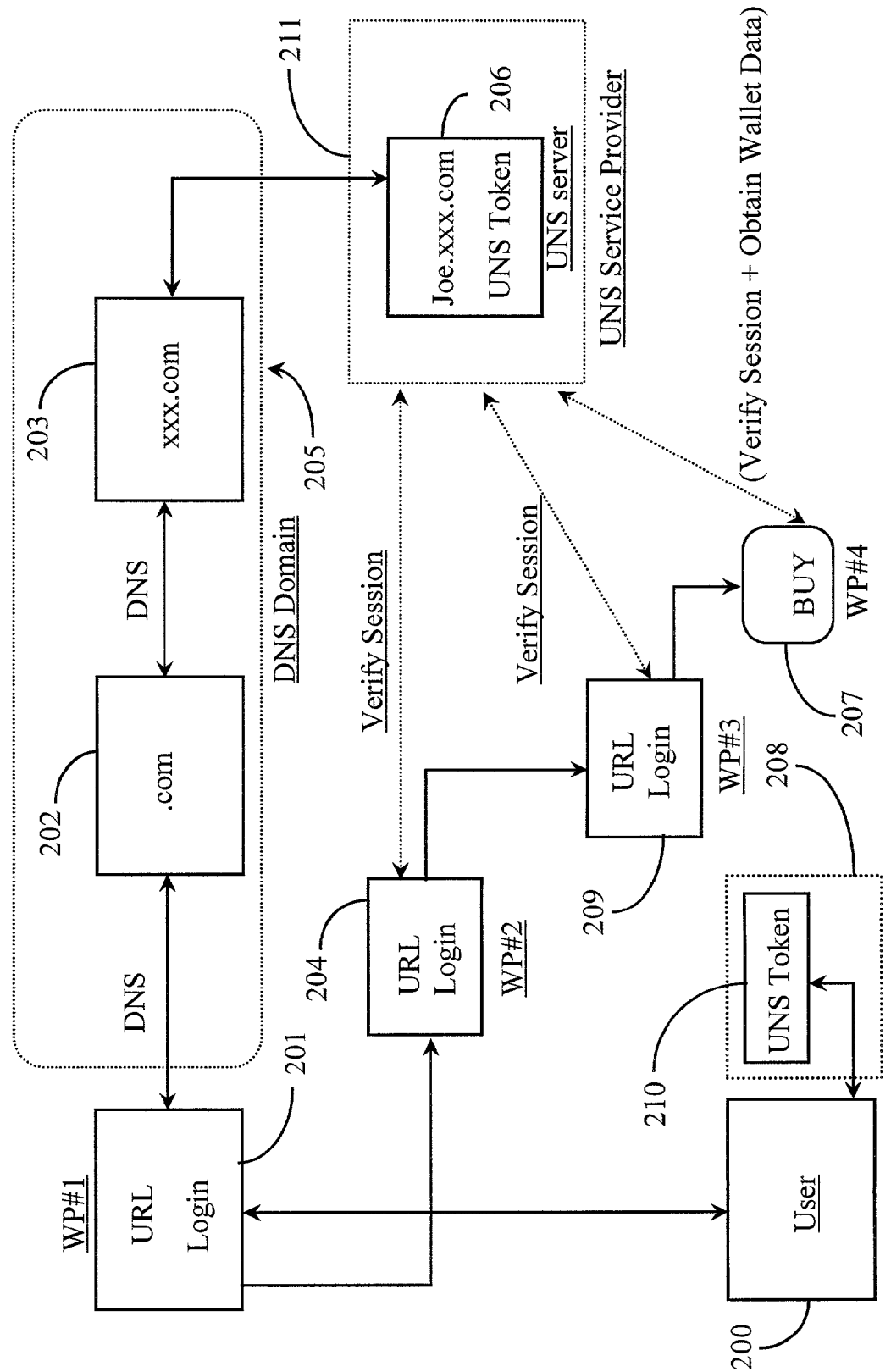
FIG. 2 is a process diagram illustrating a distributed user name service and verification resolution method according to an embodiment of the present invention.

FIG. 2 is a block diagram illustrating a UNS resolution and authentication method according to an embodiment of the present invention. In this example, a user 200 is illustrated as logging in to a Web Page (WP) #1, which is given the element number 201. WP#1 is maintained within a Web server as is known in the art. A bi-directional arrow placed between user 200 and WS 201 illustrates network connection. WS 201 is assumed to be a Web server that requires user verification at a login page to enter. At login user 200 provides a username and password to WS 201. Server 201 uses DNS to resolve network addresses from domains typed in by the user into his or her browser software. This is illustrated by a region labeled DNS Domain, and given the element number 205. Within DNS domain 205 there are machines 202 and 203 illustrated and labeled .com and xxx.com. The inventor simply illustrates that more than one machine may be involved in resolving a machine address from a domain name.

In this example, user 200 has to manually log in to access WP#1. This is because user 200 has not yet received his or her UNS token. A UNS service provider 211 is provided and adapted to generate and return a UN S token upon a first request on behalf of a user subscribed to the service of the invention. In one embodiment, provider 211 is a user's ISP and server 206 is a connection server analogous to CS 111 described with reference to FIG. 1 above.

In an embodiment wherein the user's ISP is also the UNS service provider, user 200 will already have a UNS token to send at login at WP#1. The connection server would have generated it at the time of ISP login. In some embodiments, a user may have WP#1 (201) configured as a first home page (the first page the user sees). In this case, the ISP login procedure is transparent to user 200 (remembered at user station), but manual login is required at WP#1. In any case, a UNS token must be requested, generated and sent by a UNS service provider 211 during a successful manual login (for authentication purposes) regardless of where the login occurs in order to establish a UNS session that enables user 200 to avoid subsequent login and other form population requirements. It is noted herein that the term manual login includes not only user-name and password submission sessions, but also may include authentication protocols using Web certificates, public key infrastructures, and biometric authentications such as retinal scans or fingerprint scans. For the purposes of this specification, manual login shall include any type of authentication procedure wherein a user must actively and physically participate.

A Web page (WP#2) is illustrated herein and given the element number 204. WP#2 (204) represents a subsequent login page navigated to some time after WP#1 (201) was visited. It is assumed herein that user 200 visits WP#2 during the same Internet session. WP 204 is maintained in the same or in a different server than the server hosting WP 201. When user 200 accesses WP#2 he or she already has UNS token 210 to deliver to the login server. After receiving UNS token 210 at the server hosting WP#2, the server makes a connection to the token issuer, UNS service provider 211. UNS server 206 has UNS token 210 also in cache locally. The verification call can be of an XML-based, HTML based, SOAP-based, RPC-based, or any other machine-to-machine protocol.

A Web page (WP)#3, also given the element number 209, is illustrated as yet another subsequent Web page visited by user 200 during the same session using UNS token 210. WP#3 receives UNS token 210 and verifies the session by calling Server 206 as was described with reference to page #2 above. As long as the session is still valid according to server 206, which is the generator and issuer of UNS token 210, user 200 will not have to provide a username, password or other identifying code to be treated as logged in to WP #3.

During navigation of WP #3, user 200 may select, for example, something to buy, and be served a WP#4, also designated 207, and labeled BUY. Normally, a secure form (WP#4) would be served to user 200 in order that user 200 may enter his or her wallet and access order information.

However, because the hosting server now has UNS token 210 and has already validated the session at log-in, it can simply contact server 206 at provider site 211, obtain the appropriate wallet information and re-validate the session if need be during the same transaction. User 200 would, instead of getting an order form, get an order confirmation, barring some error in the automated processing, in which case an error message would be served.

It is noted herein that if service provider 211 is an ISP and server 206 is a connection server, and if user 200 connects to WP#1–4 using server 206, then the server hosting WP#1 will receive UNS token 210 at the time of login and user 200 will not have to input any login data. However, if service provider 211 is a third party not hosting user access to the Internet, then WP#1 would require a manual login and UNS token 210 would verify user 200 according to username and password used at WP#1. User 200 configures the type and amount of information that he or she is willing to provide any Web sites or only certain Web sites. More about user configuration options is described below.

Figure 3:
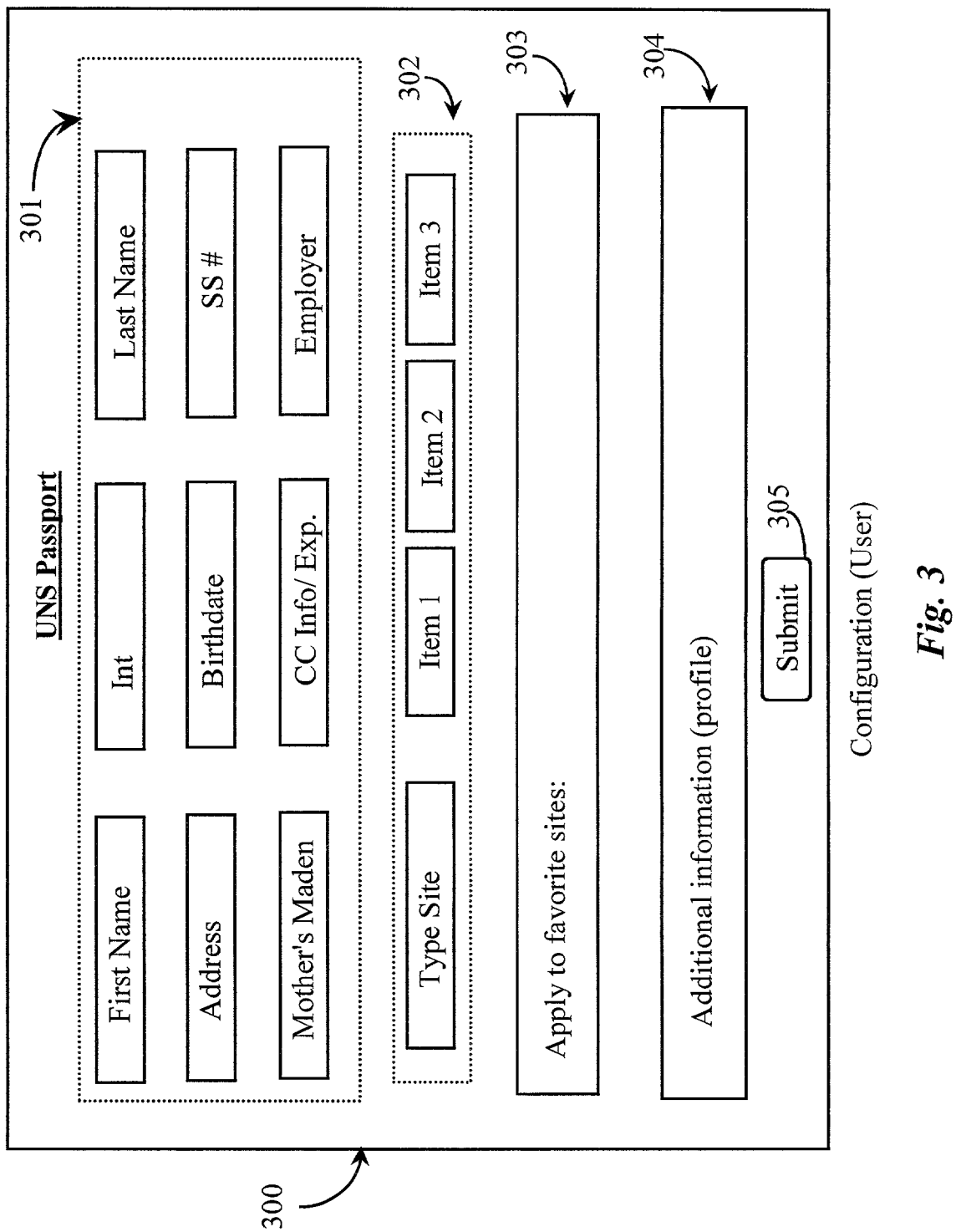
FIG. 3 is a screen shot of a configuration window of the software of the present invention.

FIG. 3 is an exemplary user configuration window 300 according to an embodiment of the present invention. Window 300 is a user configuration window that resides on, or is downloaded to, a user desktop to enable user interaction. Window 300 is adapted to configure user information such that he or she wants Web sites to have upon request. Window 300 contains a section 301 that is adapted for accepting user-personal wallet information. Reading from top left to bottom right, there are sub-sections labeled First Name, Int. (Initial) and Last Name. In a second row are sections labeled Address, Birth Date, and SS# (social security).

In a third row within section 301 are sub-sections labeled Mother's Maiden (Name), CC Info/Exp. (Information and Expiration date), and Employer (Information). Section 301 may contain further sections for inputting additional information without departing from the spirit and scope of the invention. Furthermore, section 301 may have sections that are prioritized. For example, primary credit card information may be included as well as secondary or alternate card information.

Immediately below section 301 is a section 302 adapted for inputting Web site type and item of information to make available to a specific site. For example, a user may wish that all of his information except his social security number be given to a certain type of Web site upon request. Typically, the information would be transferred when a user makes an on-line purchase or the like. Perhaps all financial Web sites have authorization to request and receive certain user information while entertainment sites cannot request the same. A section 303 is provided and adapted to enable a user to apply a certain data-share configuration to all sites listed as favorites. A section 304 is provided for inputting other types of profile data such as hobbies, interests and so on. A submission button 305 is provided and adapted to enable submission of configuration data to the service provider for application.

Window 300, when configured, tells the service provider exactly what information can be shared with which Web sites. UNS software is also provided as an extension to DNS software installed on every machine in the network. In one embodiment, Web entities may subscribe to the UNS service of the invention. In this case they may have UNS software applications provided and installed locally. In another embodiment, the UNS service is activated at any Web server by sending an executable code from the provider to a particular server, wherein the executable installs itself to DNS software and executes in accordance with client interaction within the server.

As an example, when the client using UNS accesses a login page, UNS on the server will recognize the client and look for a token. If the server finds the UNS session token, then it can call the service provider to validate the session, and will not have to require manual login procedures. If the server does not get the token from a UNS client, then manual login procedures commence and a token is then generated at the service provider using the last entered username and password.

Figure 4:
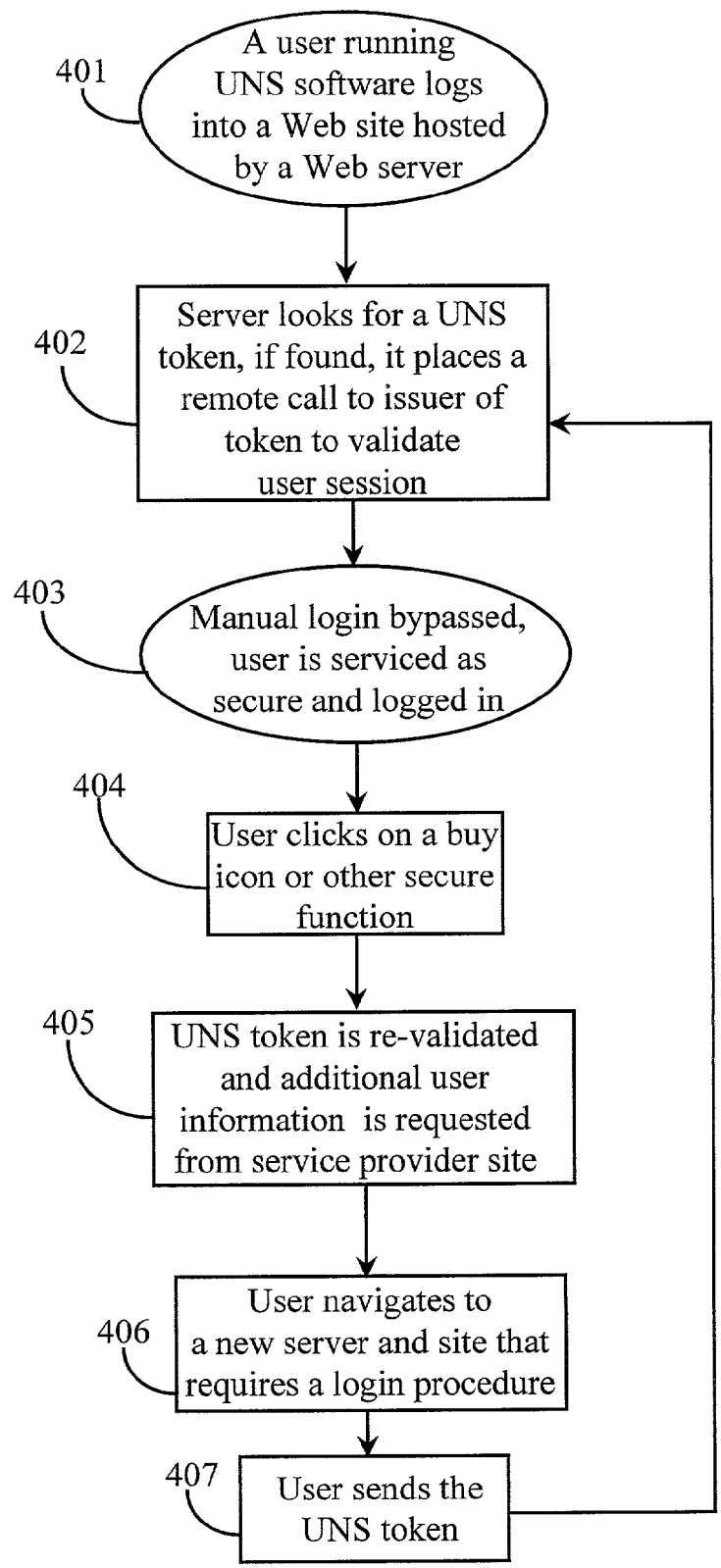
FIG. 4 is a flow diagram illustration user/system steps for verification.

FIG. 4 is a flow diagram illustrating user/system steps for client verification. At step 401 a user running UNS software logs into a Web site hosted by a Web server. The hosting server may be an ISP-maintained server that is part of a user ISP subscription, or it may be a third party server hosting any Web site. At step 402, the server looks for a UNS token, and if found, places a remote call to the issuer of the token to validate the user session. If no token is sent to the server at step 402, then one must be generated at the service provider. The instant user name and password input into login can be used as security data for the generated session token.

If a UNS token already exists and is verified at step 402, then at step 403 manual login is bypassed and the user is serviced as secure and logged in. At step 404, the user clicks on a buy icon or other secure function. Step 404 assumes that the purchase or data-access option activated by the user is part of the same Web site and host server that already has the user's UNS token. At step 405, the UNS token is re-validated and additional user information is requested from the service provider site. The information shared is sufficient to make the purchase or other secure function such that no manual data input is required of the user.

At step 406, the user navigates to a server hosting a new Web site that requires a login procedure. It is noted herein that the same server may also host the new site or it may hosted by a different server. In the case of a same server hosting the site, the server already has the UNS token. In the case of a new server, the user sends the UNS token once connected to the new site in step 407. The new site verifies the token as was described in step 402 with a remote call to the service provider site. The process ensues with step 403.

In one embodiment, once servers have retrieved a UNS token, they may cache the token so that additional remote calls to verify the owner of the token are not required. This is true as long as the user is still within the server domain of the original access and token transfer. However, the token may expire and have to be re-activated if it expires while the user is still in session. In one embodiment, this can be avoided by embedding a token re-activation module in HTML of visited Web pages in the server. In this embodiment, a re-activation of the user session occurs on a periodic basis wherein the period configured for the purpose is less than the expire-time of the token. There are many possibilities.

It will be apparent to one with skill in the art that the process described with reference to steps 401–407 may be practiced in conjunction with the current DNS convention such that the additional level of User ID can be leveraged to facilitate verification at the application level of Internet protocols. It should also be apparent that there may be more or fewer steps comprising the UNS process without departing from the spirit and scope of the invention. The process may be slightly altered dependent upon which entity provides the UNS service, be it an ISP or a third party. The method and apparatus of the invention may be adapted to use existing IP address format in a session token when identifying a machine. In one embodiment, a unique identifier could be an e-mail address with the name up front for incorporation into a unique session token. There are many such possibilities.

The method and apparatus of the present invention should be afforded the broadest scope under examination considering all possible embodiments, said examination conducted according to accepted patent law. The spirit and scope of the present invention is limited only by the following claims.

What is claimed is:

1. A system for enabling remote authentication of a user during a network session comprising:
   a server portion for serving session validation information and additional user information when queried;
   a client portion for configuring and submitting parameters constraining what and how data is to be shared with a querying entity or entities;
   a distributed portion for distribution and application at various connected network nodes for enabling said nodes to recognize and interact with the server portion;
   characterized in that the distributed portion is code that is distributed to the nodes from the client portion and is self-installable at the nodes, and the server portion generates a temporary session token, including the user's password, after a first successful authentication by the user at a first web site during a network session, the token is cached at a host machine of the server portion and at the user's machine or a proxy machine and wherein, upon navigation by the user to a second web site requiring secure authentication by the user in the form of a username and password, the token is used to identify the user via the username and password, thereby logging the user into the second web site, and a remote call, directed by the distributed portion, is used to validate the user session instead of requiring manual authentication procedures.

2. The system of claim 1 wherein the network is the Internet network and the session is a browser session.

3. The system of claim 1 wherein the communication between nodes for user session validation is XML-based.

4. The system of claim 1 wherein the communication between nodes for user session validation is HTML-based.

5. The system of claim 1 wherein the communication between nodes for user session validation is RPC-based.

6. The system of claim 1 wherein the first successful authentication before token generation is a manual login procedure to a website.

7. The system of claim 1 wherein the first successful authentication before token generation is a successful purchase.

8. A method for verifying an on-line user remotely, comprising the steps of:
   (a) generating a token for a user session, from an issuer site and including self-installing software code, the token containing at least one set of authentication data including at least a user's password just entered to gain access to a first secure site or function during the session;
   (b) storing the generated token at the user's machine or a proxy machine and at the issuer site;
   (c) delivering the generated token from the user to the first site, wherein the code self installs at the first site enabling communication from the first site to the issuer site;
   (d) recognizing the generated token information at the first site, enabled by the installed code, and using the token information including at least the user's password to validate the user as the user navigates the site;
   (e) delivering the token to a new site navigated to wherein the new site is hosted by a new server, wherein the code self installs at the new site enabling communication from the new site to the issuer site; and
   (f) recognizing the generated token information at the new site and using the token information including at least the user's password to validate the user as the user navigates the new site.

9. The method of claim 8 wherein in step (a) the authentication data is a username and password used to login to the site.

10. The method of claim 8 wherein in step (a) the authentication data is wallet information used to carry out a purchase.

11. The method of claim 8 wherein in step (b) the issuer is an ISP of the user.

12. The method of claim 8 wherein in step (c) the first site is an ISP web site.

13. The method of claim 8 wherein in step (d) validation includes a remote call to the issuer site of the token.

14. The method of claim 8 wherein in step (d) navigating the site includes subsequent logins and/or secure purchasing using the same server.

15. The method of claim 8 wherein in step (e) the new server and site are accessed within the same user session.

16. The method of claim 8 wherein in step (f) receipt of the token provides data for identifying user name and the user's IP address as well as the issuer's machine address.

* * * * *